United States Patent
Schneider et al.

(10) Patent No.: US 7,389,804 B2
(45) Date of Patent: *Jun. 24, 2008

(54) APPARATUS FOR PRODUCING ELASTOMERIC NONWOVEN LAMINATES

(75) Inventors: Uwe Schneider, Mason, OH (US); Randall Allen Myers, Fairfield Township, OH (US); Christoph Johann Schmitz, Euskirchen (DE); Martin Geoffrey Scaife, Cologne (DE)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/787,373

(22) Filed: Apr. 17, 2007

(65) Prior Publication Data

US 2007/0193678 A1 Aug. 23, 2007

Related U.S. Application Data

(63) Continuation of application No. 10/836,944, filed on Apr. 30, 2004, now Pat. No. 7,222,654.

(51) Int. Cl.
*B32B 37/00* (2006.01)
(52) U.S. Cl. .................. 156/361; 156/436; 156/498; 156/500
(58) Field of Classification Search ............ 156/361, 156/436, 498, 499, 500, 501, 550, 555, 580, 156/582, 583.1
See application file for complete search history.

(56) References Cited

U.S. PATENT DOCUMENTS

| | | |
|---|---|---|
| 3,468,748 A | 9/1969 | Bassett |
| 3,575,782 A | 4/1971 | Hansen |
| 4,720,415 A | 1/1988 | Vander Wielen et al. |
| 5,143,679 A | 9/1992 | Weber et al. |
| 5,156,793 A | 10/1992 | Buell et al. |
| 5,167,897 A | 12/1992 | Weber et al. |
| 5,385,775 A | 1/1995 | Wright |
| 5,681,302 A | 10/1997 | Melbye et al. |
| 5,693,165 A | 12/1997 | Schmitz |
| 5,814,178 A | 9/1998 | Jacobs |
| 5,964,973 A | 10/1999 | Heath et al. |
| 6,248,851 B1 | 6/2001 | Maugans et al. |
| 6,969,441 B2 | 11/2005 | Welch et al. |
| 7,028,735 B2 | 4/2006 | Schneider et al. |
| 7,222,654 B2 * | 5/2007 | Schneider et al. ........... 156/361 |
| 2002/0019616 A1 | 2/2002 | Thomas |
| 2002/0119722 A1 | 8/2002 | Welch et al. |

FOREIGN PATENT DOCUMENTS

WO  WO 92/16366 A1  10/1992

* cited by examiner

*Primary Examiner*—James Sells
(74) *Attorney, Agent, or Firm*—John G. Powell; John P. Colbert; Matthew P. Fitzpatrick

(57) ABSTRACT

An apparatus for producing an elastomeric nonwoven laminate including a plurality of elastomeric strands joined to a nonwoven web in a controlled distribution is provided. The apparatus includes an extruder for extruding a plurality of elastomeric strands onto a cooled surface of a rotating drum, which transports the strands in parallel alignment to a nip formed between two rollers rotating about parallel axis. The drum transfers the plurality of strands to the nip in a controlled distribution where it is bonded with the nonwoven. The apparatus also includes elements which automate the apparatus for creating the elastomeric nonwoven laminate.

10 Claims, 12 Drawing Sheets

APPARATUS FOR PRODUCING ELASTOMERIC NONWOVEN LAMINATES

CROSS REFERENCE TO RELATED APPLICATIONS

This application is a continuation of U.S. Application Ser. No. 10/836,944, filed Apr. 30, 2004, now U.S. Pat. No. 7,222,654, the substance of which is incorporated herein by reference.

FIELD OF THE INVENTION

The present invention relates to a method and apparatus for manufacturing an elastomeric nonwoven laminate comprising a plurality of elastomeric strands and nonwoven material. More particularly, the present invention relates to a method and apparatus for automating the manufacturing of an elastomeric nonwoven laminate comprising a plurality of elastomeric strands and nonwoven material.

BACKGROUND OF THE INVENTION

Disposable fluid-handling articles are often produced on high-speed converting lines using continuous webs of fabrics, films, foams, elastomerics, etc. Many of these articles preferably include an elastomeric region or component. Typically, the elastomeric component is covered on at least one side, and preferably two sides, by a nonwoven. This combination of nonwoven and an elastomeric is referred to hereinafter as an elastomeric nonwoven laminate.

Elastomeric nonwoven laminates typically include an elastomeric bonded to a nonwoven. The elastomeric may include elastic film or elastomeric strands; however, elastomeric strands are generally preferred over elastic films since strands require less material and provide flexibility in arrangement and stretch properties. In one such laminate, a plurality of elastomeric strands is joined to a nonwoven while the plurality of strands is in a stretched condition so that when the elastomeric strands relax, the nonwoven gathers between the locations where it is bonded to the elastomeric strands forming corrugations. The resulting laminate is stretchable to the extent that the corrugations allow the elastomeric to elongate.

Elastomeric nonwoven laminates with elastomeric strands may be produced by extruding a plurality of heated filaments onto a conveyor or roller where the filaments are cooled and transferred to a nonwoven. Alternatively, the plurality of strands may be unwound from a supply roll and joined to a nonwoven. In either case, arranging the strands uniformly on the nonwoven can be difficult. The elastomeric strands are typically transferred to the nonwoven and bonded by passing the combination through a nip formed between two rolls.

When using extruded strand elastomerics, there are many situations which increase the startup time for the process, increase the amount of wasted material, or cause downtime for the process. For instance, in a typical elastomeric extrusion process, a nozzle opening that emits the molten elastomeric is larger than the actual size of the elastomeric strand. The molten strand is typically drawn such that the diameter of the elastomeric strand which ends up in the laminate structure is smaller than the size of the initial elastomeric strand emitted. During startup and the initial extrusion however, the elastomeric strands will tend to slide on the conveyor or roller. Because there is little normal force active upon the strands, the strands will tend to slide upon the conveyor or roller. Until a sufficient length of elastomeric strand has been emitted, the strand will typically continue to slide upon the conveyor or roller thereby increasing the startup time for the process.

Other problems include the transfer of the elastomeric strands to the nonwoven. Because the elastomeric strands are typically unsupported, the vibrations and speed of operation cause the strands to fall out of alignment, overlap, entangle, and bundle with neighboring strands. The unsupported strands can also break or stick to the conveyor and not transfer to the nonwoven at all which results in downtime for the process.

In addition to the transfer of the elastomeric strands, broken strands can also cause significant problems particularly if the strands are tensioned. If a strand breaks under tension, the strand will tend to snap back a significant distance towards its origination such that the alignment of the strands is disturbed thereby causing much of the resulting laminate corresponding to the snap back area to be wasted.

Consequently, it would be beneficial to provide a method and apparatus for producing an elastomeric nonwoven laminate that is capable of placing the plurality of continuous elastomeric strands in a controlled distribution on the mating nonwoven. In addition, it would be beneficial to provide an apparatus capable of reducing the amount of startup time for the threading of the elastomeric strands, capable of reducing the misalignment that strands under tension cause when they break, and capable of automatically capturing and threading elastomeric strands that fail to transfer to the nonwoven.

SUMMARY OF THE INVENTION

The present invention provides an apparatus and method for producing an elastomeric nonwoven laminate including a plurality of elastomeric strands bonded to a nonwoven web in a controlled distribution. The apparatus includes an extruder for extruding a plurality of elastomeric strands on a cooled surface of a drum, which conveys the plurality of strands to a transferring device. A first nonwoven having a first bonding surface is supplied from a first nonwoven source to the transferring device. The transferring device is positioned close to the cooled surface of the drum to receive the plurality of elastomeric strands while allowing for a minimal span of unsupported strands during the transfer. The first nonwoven passes through the transferring device at second velocity V2 such that the first bonding surface receives the elastomeric strands conveyed from the cooled surface of the drum at first velocity V1. The elastomeric strands are pre-strained prior to being attached to the first bonding surface because V2 is greater than V1.

In one embodiment, the apparatus includes a startup device disposed adjacent to the drum. The calendaring device is adaptable for engaging or disengaging the cooled surface of the drum such that when the calendaring device engages the cooled surface of the drum, the plurality of elastomeric strands travel along the cooled surface of the drum at the surface speed $V_1$ of the drum.

In another embodiment, the apparatus includes an idler roller positioned between the first nonwoven source and the transferring device adjacent to the cooled surface of the drum. The idler roller directs the first bonding surface to make contact with the cooled surface of the drum so that the first bonding surface removes strands from the cooled surface of the drum that inadvertently fail to transfer to the transferring device. This embodiment also includes a second nonwoven source supplying a second nonwoven which has a second bonding surface to the transferring device. An adhesive source for applying adhesive to the second bonding surface in advance of the transferring device is also included.

In another embodiment this apparatus may include a scraper positioned adjacent to the cooled surface of the drum. The scraper is adaptable for engaging the cooled surface of the drum to remove elastomeric strands that inadvertently fail to transfer to the transferring device.

In another embodiment, the apparatus includes a deflector device disposed adjacent to the cooled surface of the drum. The deflector device minimizes the snap back distance that elastomeric strands exhibit upon breaking.

In another embodiment, when the transferring device comprises a first and second roller which form a first nip therebetween, the apparatus also includes a third roller and a fourth roller forming a second nip therebetween. The third and fourth roller each have a surface speed $V_3$ where $V_3$ is less than the surface speed $V_2$ of the first and second rollers. A second nonwoven source supplying a second nonwoven to the third roller is also included. The second nonwoven has a second bonding surface which is directed to contact the first roller such that the second bonding surface removes strands from the first roller that inadvertently fail to transfer to the elastomeric laminate. The second bonding surface of the second nonwoven is directed to contact the first roller by a plurality of rollers disposed between the second nonwoven source and the third roller. This embodiment also includes a second adhesive source for applying adhesive to the second bonding surface in advance of the second nip thereby joining the second nonwoven to the elastomeric laminate.

BRIEF DESCRIPTION OF THE DRAWINGS

While the specification concludes with claims particularly pointing out and distinctly claiming the subject matter that is regarded as the present invention, it is believed that the invention will be more fully understood from the following description taken in conjunction with the accompanying drawings. None of the drawings are necessarily to scale.

FIG. 9b is a cross sectional view of the elastomeric nonwoven laminate depicted in FIG. 9a.

DETAILED DESCRIPTION OF THE INVENTION

Figure 1:
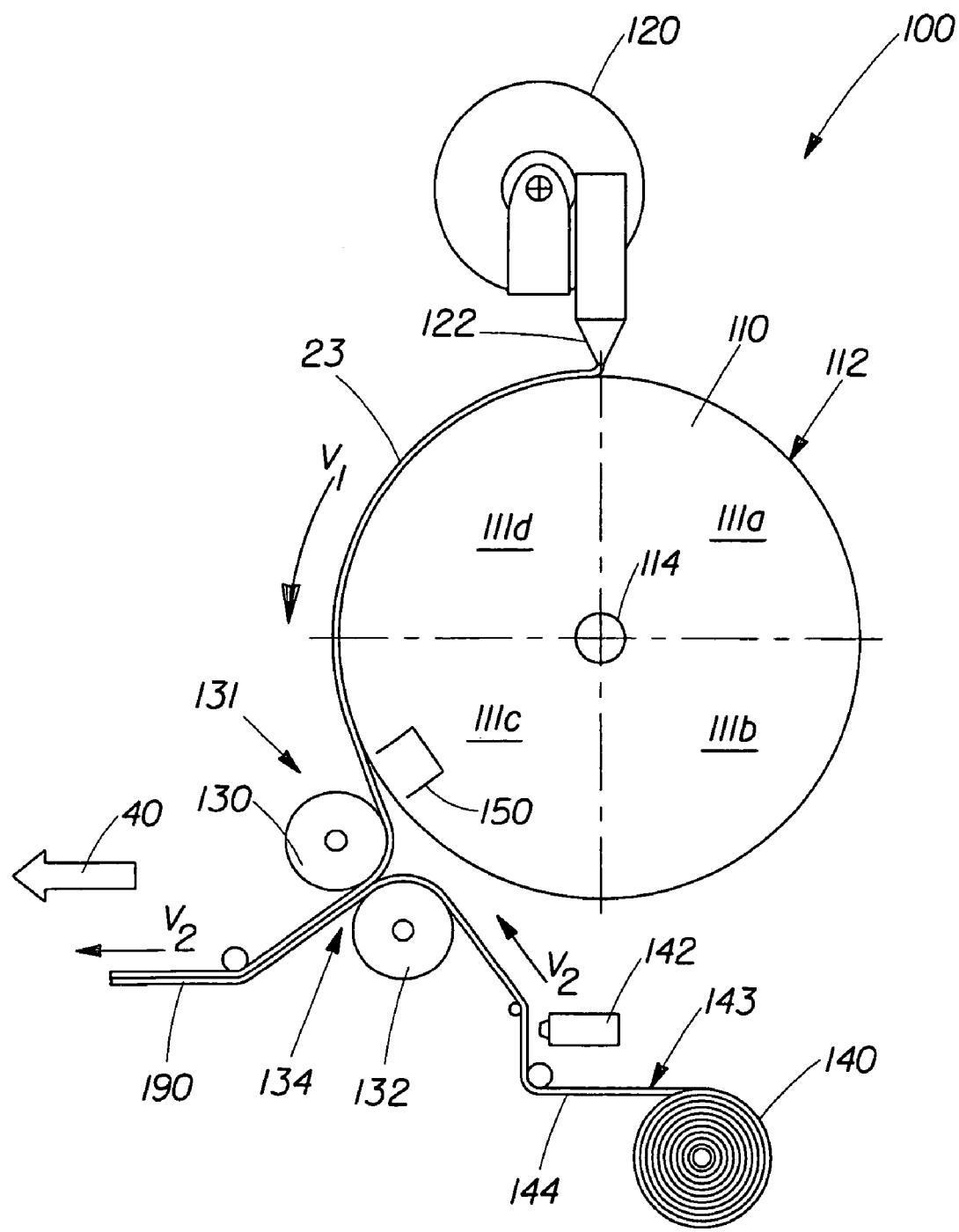
FIG. 1 is a schematic side elevation view of an apparatus for laminating a nonwoven and a plurality of strands of elastomeric forming an elastomeric nonwoven laminate according to the present invention.

The method and apparatus of the present invention are designed to provide a more consumer desirable elastomeric nonwoven laminate suitable for use in a variety of articles including a disposable fluid-handling article. The elastomeric nonwoven laminate comprises a nonwoven and an elastomeric composed from at least one layer of a plurality of elastomeric strands and at least one layer of a nonwoven material. The method and apparatus are capable of efficiently producing an elastomeric nonwoven laminate having a controlled distribution of elastomeric strands.

Definitions

The following terminology is used herein consistent with the plain meaning of the terms with further details provided in the present specification.

"Live stretch" includes stretching elastic and bonding the stretched elastic to a nonwoven. After bonding, the stretched elastic is released causing it to contract, resulting in a "corrugated" nonwoven. The corrugated nonwoven can stretch as the corrugated portion is pulled to about the point that the nonwoven reaches at least one original flat dimension.

"Continuous filaments" refers to strands of continuously formed polymeric filaments. Such filaments are formed by extruding molten material through a die head having a certain type and arrangement of capillary holes therein.

"Controlled distribution" refers to a parallel arrangement of elastic strands having no overlapping or bundles of strands where the variation in distance between the elastic strands from the point of extrusion to the point of lamination is minimal.

A "converting facility" refers to any production equipment producing one or more components of a disposable fluid-handling article that are subsequently assembled into a finished disposable fluid-handling article. It may also produce a finished disposable fluid-handling article that is complete for use by a consumer.

An "elastic," "elastomer" or "elastomeric" refers to polymers exhibiting elastic properties. They include any material that upon application of a force to its relaxed, initial length can stretch or elongate to an elongated length more than 10% greater than its initial length and will substantially recover back to about its initial length upon release of the applied force.

An "extrusion apparatus" or "extruder" refers herein to any machine capable of extruding a molten stream of material such as a polymeric through one or more extrusion dies.

The term "extrude" or "extruding" refers herein to a process by which a heated elastomer is forced through one or more extrusion dies to form a molten stream of elastic that cools into a solid.

The term "molten stream" refers herein to a linear deposit of a heated liquid material such as a polymeric exiting an extrusion apparatus. The stream may include continuous filaments, discontinuous fibers, or continuous films of a polymeric material. When cooled, the molten stream forms an elastic strand.

The term "joined" herein encompasses configurations whereby a material or component is secured directly or indirectly (by one or more intermediate members) to another material or component. An example of indirect joining is an adhesive. Direct bonding includes heat in conjunction with or alternatively pressure bonding. Joining may include any means known in the art including, for example, adhesives, heat bonds, pressure bonds, ultrasonic bonds, and the like.

The term "nonwoven" refers herein to a material made from continuous (long) filaments (fibers) and/or discontinuous (short) filaments (fibers) by processes such as spunbonding, meltblowing, and the like. Nonwovens do not have a woven or knitted filament pattern.

Nonwovens are typically described as having a machine direction and a cross direction. The machine direction is the direction in which the nonwoven is manufactured. The cross direction is the direction perpendicular to the machine direction. Nonwovens are typically formed with a machine direction that corresponds to the long or rolled direction of fabrication. The machine direction is also the primary direction of fiber orientation in the nonwoven.

Description

FIG. 1 shows a side view of an apparatus 100 according to the present invention for producing elastomeric nonwoven laminate 190. The apparatus 100 includes a drum 110 rotating about an axis 114 and having a surface speed $V_1$. The drum 110 is glycol cooled to provide a cooled external surface 112. The temperature of the cooled external surface is maintained between 0° C. and 5° C. For orientation purposes, the drum 110 has a first quadrant 111a between 12 o'clock and 3 o'clock, a second quadrant 111b between 3 o'clock and 6 o'clock, a third quadrant 111c between 6 o'clock and 9 o'clock, and a fourth quadrant 111d between 9 o'clock and 12 o'clock. The upper half is represented by the first and fourth quadrant 111a and 111d, while the lower half is represented by the second and third quadrant 111b and 111c.

A drum, in accordance with the apparatus described herein, can be sized to accommodate any size laminate or process set up. For instance a larger drum may be utilized for offline material production operations where the elastomeric nonwoven laminate is stored on a roll or in a box for future use. Smaller drum sizes may be required for online operations incorporated upstream of a converting operation. For offline operations, the diameter of the drum may be approximately one meter or larger, whereas for online operations the diameter of the drum may be approximately 0.5 meters or less. Similarly for offline operations, the width of the drum may be approximately one meter or larger whereas for online operations the width of the drum may be limited to approximately one meter or less. The rotation of the drum can be powered by a variable speed motor capable of ramping up or down depending on the operator's demand.

The apparatus 100 includes an extruder 120 for extruding a molten stream of elastomeric polymer. The extruder 120 extrudes the molten stream of polymer through a plurality of nozzles 122 forming a plurality of elastomeric strands 23 that flow in parallel alignment onto the cooled surface 112 of the rotating drum 110. Preferably, the elastomeric strands are extruded onto the cooled surface 112 of the drum 110 such that the distance between any two adjacent strands ranges between about 1 mm and about 3 mm. More preferably, the distance between any two adjacent strands is about 1.5 mm. The extruder 120 is mounted between the first and fourth quadrants 111a, 111d and deposits the plurality of strands 23 onto the cooled surface 112 of the drum 110 near 12:00 o'clock.

The extruder 120 preferably includes a built in metering pump, valve and nozzle arrangement wherein the metering pump and valve are positioned in proximity to the nozzle in order to provide a controlled discharge of polymer. The controlled discharge of polymer ensures that an adequate supply of polymer is supplied to the cooled surface of the drum particularly during starts and stops. Excessive flow of polymer during stops can cause localized heating of the cooled surface of the drum which can lead to polymer build up caused by the elastomeric strands sticking to the surface of the drum.

A transferring device 131 is mounted near the cooled surface 112 of the drum 110 at the third quadrant 111c. The transferring device may comprise a single roller, a plurality of rollers, or any other device known in the art for combining a plurality of elastomeric strands to a nonwoven or woven web or combining a plurality of nonwovens or woven webs or any combination thereof.

For the embodiment shown in FIG. 1, the transferring device comprises a first roller 130 and a second roller 132. The first and second rollers 130, 132 rotate about two parallel axes forming a nip 134 therebetween, where each provides a surface speed $V_2$. The surface speed $V_2$ of each of the rollers is greater than the surface speed $V_1$ of the drum.

The first roller 130 is positioned proximate to the cooled surface 112 of the drum 110 to minimize the span 150 of unsupported strands transferring from the cooled surface 112 of the drum 110 to the first roller 130. Preferably, the first roller is positioned as close to the cooled surface of the drum as possible without actually making contact. The actual measured distance separating the two depends upon the sizes of the drum and the first roller. For instance, for a drum diameter of 1 meter and a first roller diameter of 150 mm, the distance between the cooled surface 112 of the drum 110 and the first roller 130 can range from approximately 0.5 mm to about 5 mm. The corresponding length of the span 150 of unsupported strands can range from about 18 mm to about 75 mm. For smaller size drums, the length of the span 150 of unsupported strands can be shorter. For instance, a 0.5 meter diameter drum with a 150 mm first roller 130 can enable the first roller 130 to be positioned as close as 1 mm to the cooled surface 112 of the drum 110 and limit the length of the span 150 of unsupported strands to about 22 mm.

The first roller 130 receives the plurality of strands 23 near the cooled surface 112 of the drum 110, minimizing the span 150 of unsupported strands between the cooled surface 112 of the drum 110 and the first roller 130. Preferably, the plurality of strands 23 transfers from the cooled surface 112 of the drum 110 to the first roller such that the strands are approximately tangent to both the cooled surface of the drum and the surface of the first roller 130 and the length of the span 150 of unsupported elastomeric strands 23 is minimal, ranging between about 10 mm and about 200 mm. Preferably, the length of the span 150 of unsupported elastomeric strands 23 during the transfer ranges between about 20 mm and about 50 mm. By minimizing the length of the span of unsupported strands during the transfer, the elastomeric strands can be transferred to the first roller in a controlled distribution where the distance measured between any two adjacent strands varies 30% or less from the point of extrusion to the point of lamination. For instance, if the original spacing at the extruder is set at 1 mm, the spacing between any two adjacent strands will range between 0.7 mm to 1.3 mm.

For the embodiment shown in FIG. 1, a first nonwoven source 140 supplies a first nonwoven 144 having a first bonding surface 143 to the second roller 132 forming the nip 134 with the first roller 130. A first adhesive source 142 positioned between the first nonwoven source 140 and the second roller 132 applies adhesive to the first bonding surface 143. The first nonwoven 144 and the plurality of elastomeric strands 23 pass between the nip 134 formed by the first and second rollers 130, 132 forming the laminate. As mentioned previously, because V2 is greater than V1, the difference in velocity strains the plurality of elastomeric strands 23 at the nip. Once the strain is relieved from the strands, corrugations form in the nonwoven providing an elastomeric nonwoven laminate 190.

Upon exiting the nip 134, the elastomeric nonwoven laminate 190 may be conveyed directly to a converting operation which manipulates the laminate to form a component of a disposable absorbent article such as an elastic waist band, an elastic cuff or an elastic side panel. Alternatively, the elastomeric nonwoven laminate 190 may be joined with a second nonwoven or other material and stored on a roll or in a box for future use.

Figure 1A:
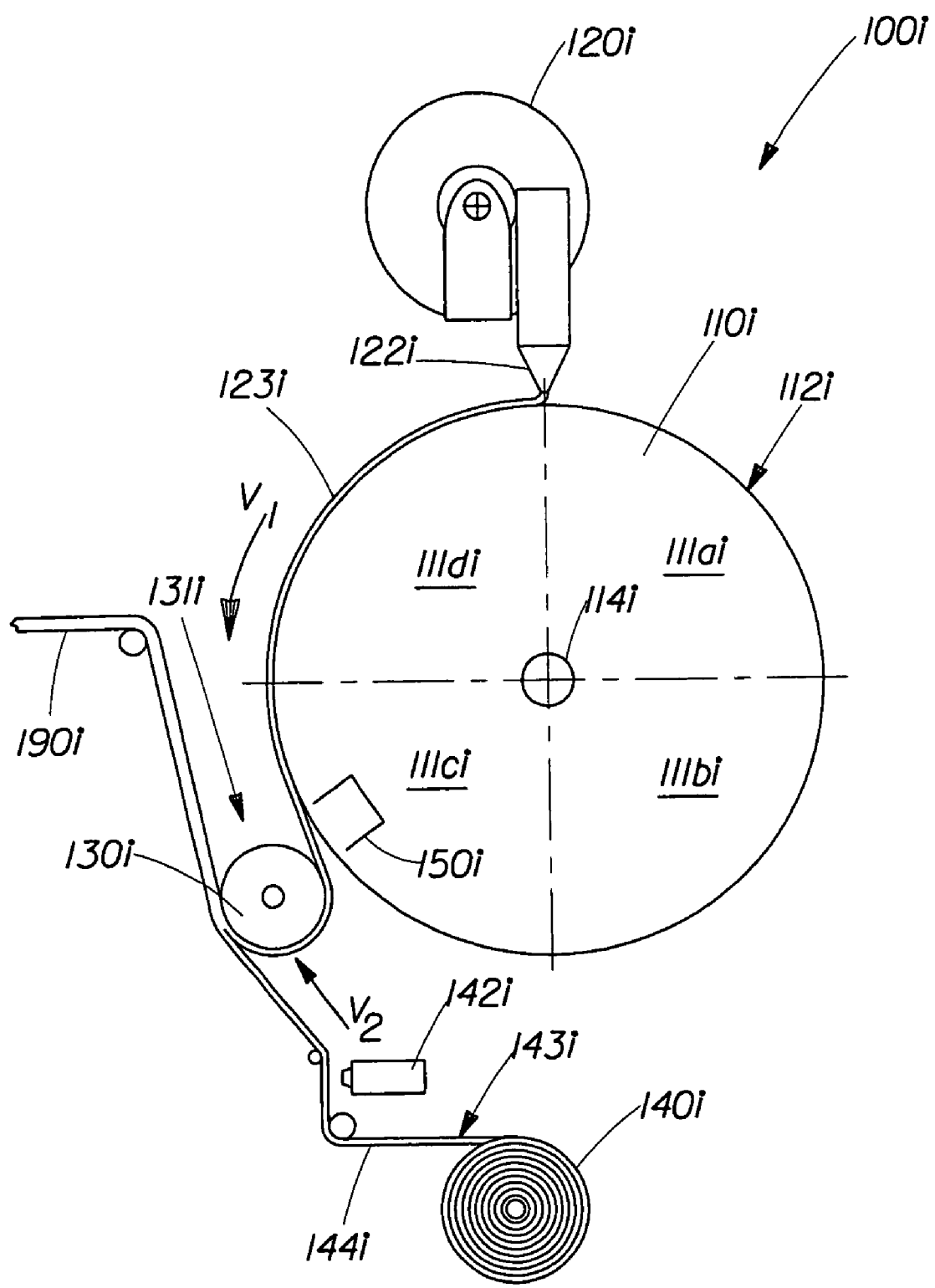
FIG. 1A is a schematic side elevation view of an alternative apparatus for laminating a nonwoven and a plurality of strands of elastomeric material forming an elastomeric nonwoven laminate according to the present invention.

Alternatively, the transferring device 131$i$ may comprise a single roller, e.g. the first roller 130$i$, as shown in FIG. 1A which forms the laminate structure. The first nonwoven 144$i$ is provided to the single roller 130$i$ by the first nonwoven source 140$i$. The first bonding surface 143$i$ of the first nonwoven 144$i$ is provided with adhesive from an adhesive source 142$i$. As the first bonding surface 143$i$ of the first nonwoven 144$i$ contacts the single roller 130$i$, the tension on the first nonwoven 144$i$ causes the first nonwoven 144$i$ to exert a force against the single roller 130$i$. The force exerted by the first nonwoven 144$i$ is sufficient to combine the first nonwoven 144$i$ and the elastomeric strands 123$i$ thereby forming an elastomeric nonwoven laminate 190$i$. Also, the transferring device shown in FIG. 1A can be utilized in any of the following embodiments with the exception of the apparatuses shown in FIGS. 7 and 8.

When the extruder initially extrudes the elastomeric strands through the plurality of nozzles, the strands slip with respect to the cooled external surface of the drum. A startup device can be incorporated into the apparatus such that the slippage between the strands and the cooled external surface of the drum is minimized. The startup device may comprise a conveyor which contacts the cooled external surface of the drum. Also the startup device may comprise any mechanism which causes one or more strands to move at the same speed as the surface speed of the drum V1.

Figure 2:
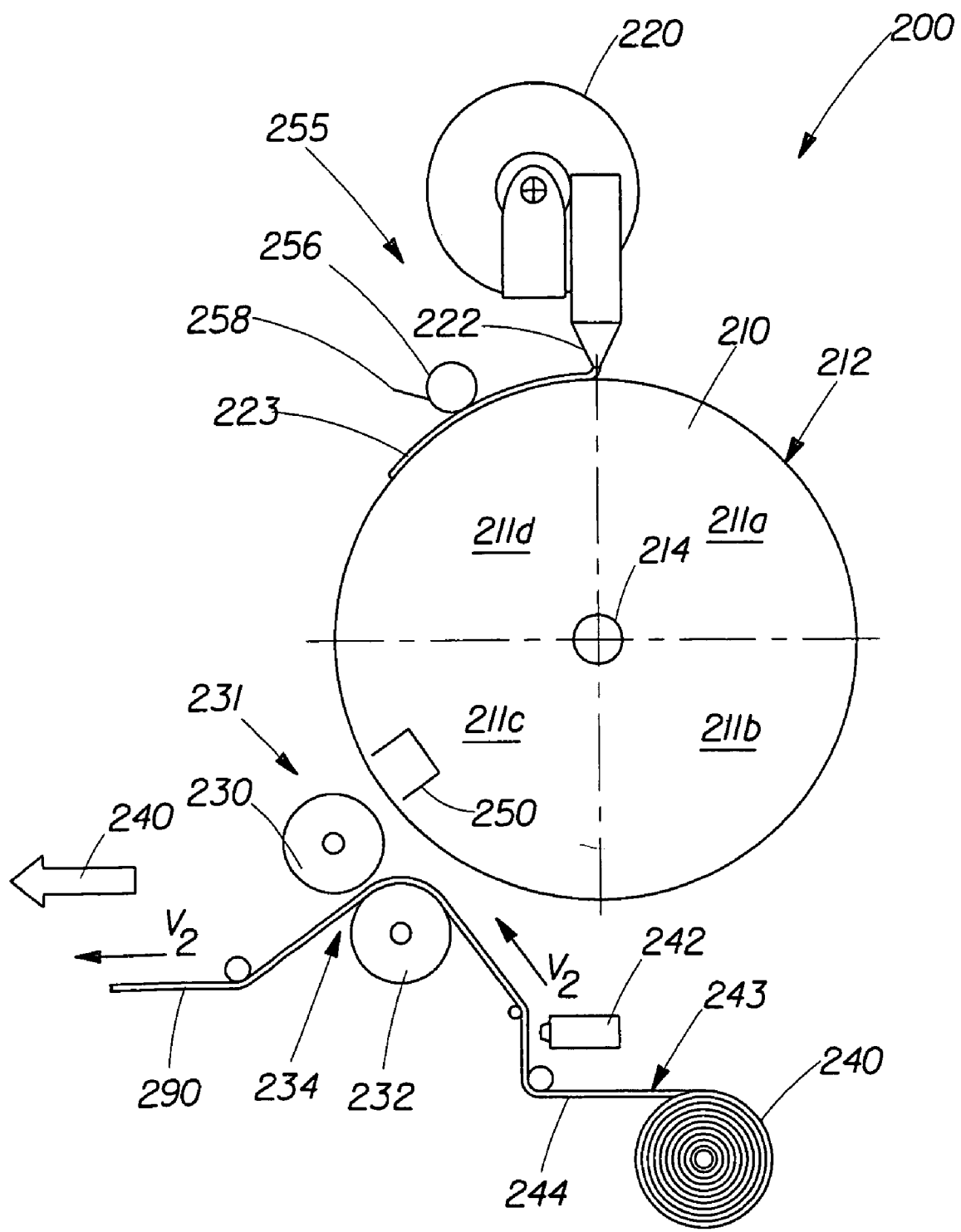
FIG. 2 is a schematic side elevation view of the apparatus in FIG. 1 including features which reduce startup time.

For the embodiment shown in FIG. 2, the startup device 255 comprises a calender roll 256. The calendar roll 256 engages the cooled external surface 212 of the drum 210 during the initial startup of the apparatus until the strands 223 are long enough to avoid slipping.

Shortly after contacting the cooled external surface 212 of the drum 210, the extruded strands 223 contact the calender roll 256. The calender roll 256, being engaged with the cooled external surface 212 of the drum 210, increases the friction between the strands 223 and the cooled external surface 212 of the drum 210 thereby discouraging slippage by the strands 223. The calender roll 256 engages the cooled external surface 212 of the drum 210 such that the strands 223 are compelled to travel at the same speed as the surface speed of the drum 210. After the strands 223 have reached a sufficient length, the strands will begin to be pulled by the drum 210 and will no longer require the increase in friction that the calender roll 256 provides. When this occurs, the calender roll 256 can be disengaged from the cooled external surface 212 of the drum 210.

Optionally, a scraper 258 can be incorporated into the apparatus 200 in order to preclude the elastomeric strands 223 from winding around the calendar roll 256. As the calender roll 256 applies force to the elastomeric strands 223 causing the strands 223 to travel at the same speed as the surface speed of the drum 210, the elastomeric strands 223 have the potential to leave the cooled external surface 212 of the drum 210 and wind around the calender roll 256. Because the scraper 258 engages the calender roll 256, the strands 223 are precluded from following the surface of the calender roll 256 and thereby winding around the calender roll 256. The scraper 258 can be incorporated with any of the startup devices disclosed herein.

Conveying elastomeric strands from an extruder to a first roller via a rotating drum is difficult to maintain over an extended period of time as a result of build up on the drum caused by elastomeric strands having the tendency to break and stick to the surface of the drum thereby failing to transfer to the transferring device. In addition, manual threading of the elastomeric strands from the cooled surface of the drum to the transferring device is often required at startup since the light weight of the elastomeric strands causes them to stick to the surface of the drum rather than automatically making the transfer onto the transferring device. Consequently, an alternate embodiment is provided in FIG. 3 including an additional apparatus for maintaining the cleanliness of the drum during normal operation and automatically threading the strands to the transferring device during startup.

Figure 3:
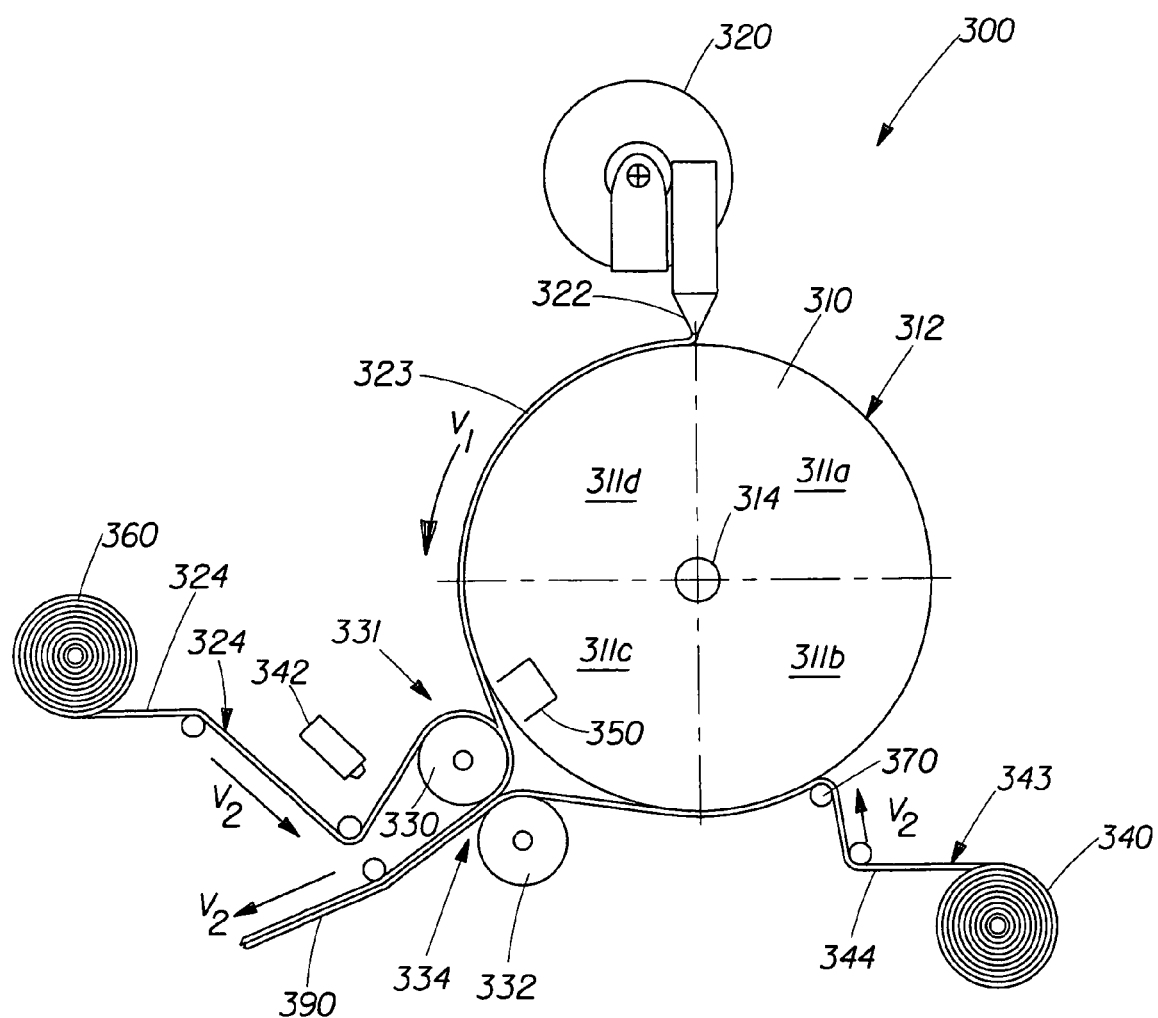
FIG. 3 is a schematic side elevation view of an apparatus for laminating a first nonwoven to a second nonwoven including features which enable the first nonwoven to swipe the drum clean of residual elastomeric strands in advance of the transferring device and provide self threading of the elastomeric strands.

As shown in FIG. 3, an idler roller 370 is positioned between the first nonwoven source 340 and the second roller 332, which is disposed adjacent to the second quadrant 311$b$ of the cooled surface 312 of the drum 310. The idler roller 370 directs the first bonding surface 343 of the first nonwoven 344 to contact the cooled surface 312 of the drum 310 in advance of reaching the second roller 332. By making contact with the cooled surface 312 of the drum 310, the first bonding surface 343 can remove elastomeric strands that stick to the cooled surface 312 of the drum 310 and fail to transfer to the nip 334 formed by the first and second rollers 330, 332. Because the first nonwoven 344 is fed directly into the second roller 332, any strands 323 which were removed by the first bonding surface 343 are fed into the nip 334.

A second nonwoven source 360 provides a second nonwoven 324 to be joined with the first nonwoven 344 and the plurality of elastomeric strands 323 in the nip 334. The second nonwoven 324 has a second bonding surface 325 and is provided to the first roller 330 which forms the nip 334 with the second roller 332. An adhesive source 342 applies adhesive to the second bonding surface 325 such that when the first and second nonwovens 321, 324 pass between the nip 334 sandwiching the plurality of elastomeric strands 323 therebetween, a laminate 390 is formed.

At the nip 334, a first strain is produced on the elastomeric strands 323 as a result of the elastomeric strands 323 being extended in the machine direction. The strain is induced due to the difference in surface speeds, V2 and V1, as discussed previously with regard to FIG. 1. The greater the speed differences between the first speed V1 and the second speed V2, the greater the resulting strain. For the present invention, the difference in speed creates a strain on the plurality of elastomeric strands 323 ranging from about 20% to about 500%.

Figure 4:
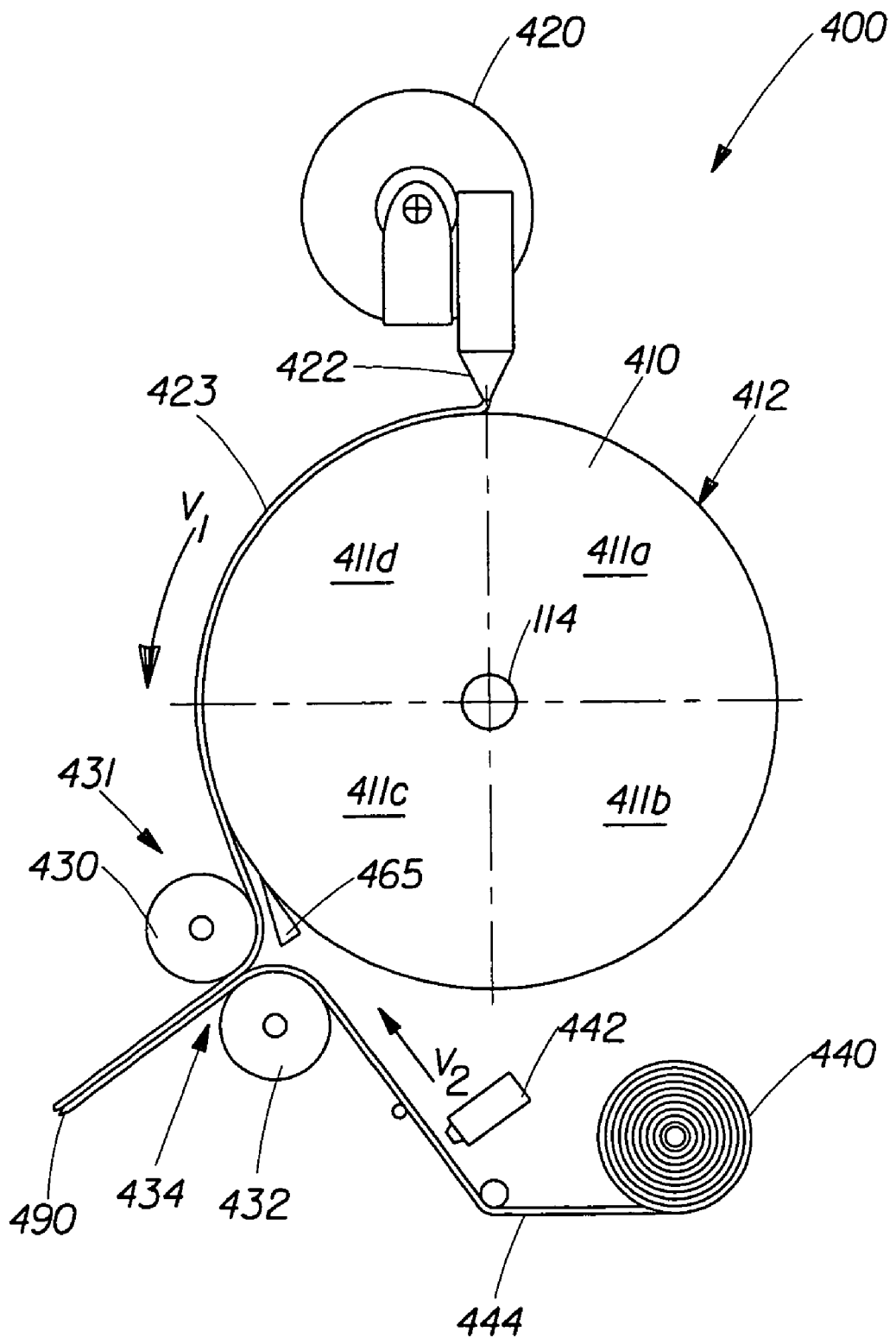
FIG. 4 is a schematic side elevation view of the apparatus in FIG. 1 including features for self threading of the elastomeric strands to the transferring device.

In an alternative embodiment, the apparatus may incorporate a scraper 465 which engages the cooled external surface 412 of the drum 410 as exemplified in FIG. 4. Any strands 423 which do not leave the cooled external surface 412 of the drum 410 in the proximity of the nip 434 are removed from the cooled external surface 412 of the drum 410 by the scraper 465. The proximity of the first roller 430 and the second roller 432 to the scraper 465 insures that once any strands 423 are removed from the cooled external surface 412 of the drum 410, the strands 423 engage the first bonding surface 443 of the first nonwoven 444 downstream of the adhesive source 442. Because the removed strands engage the first bonding surface 422 of the first nonwoven 421 downstream of the adhesive source 442, the strands are transported such that they go through the nip 434 and re-engage the first roller 430.

Figure 5:
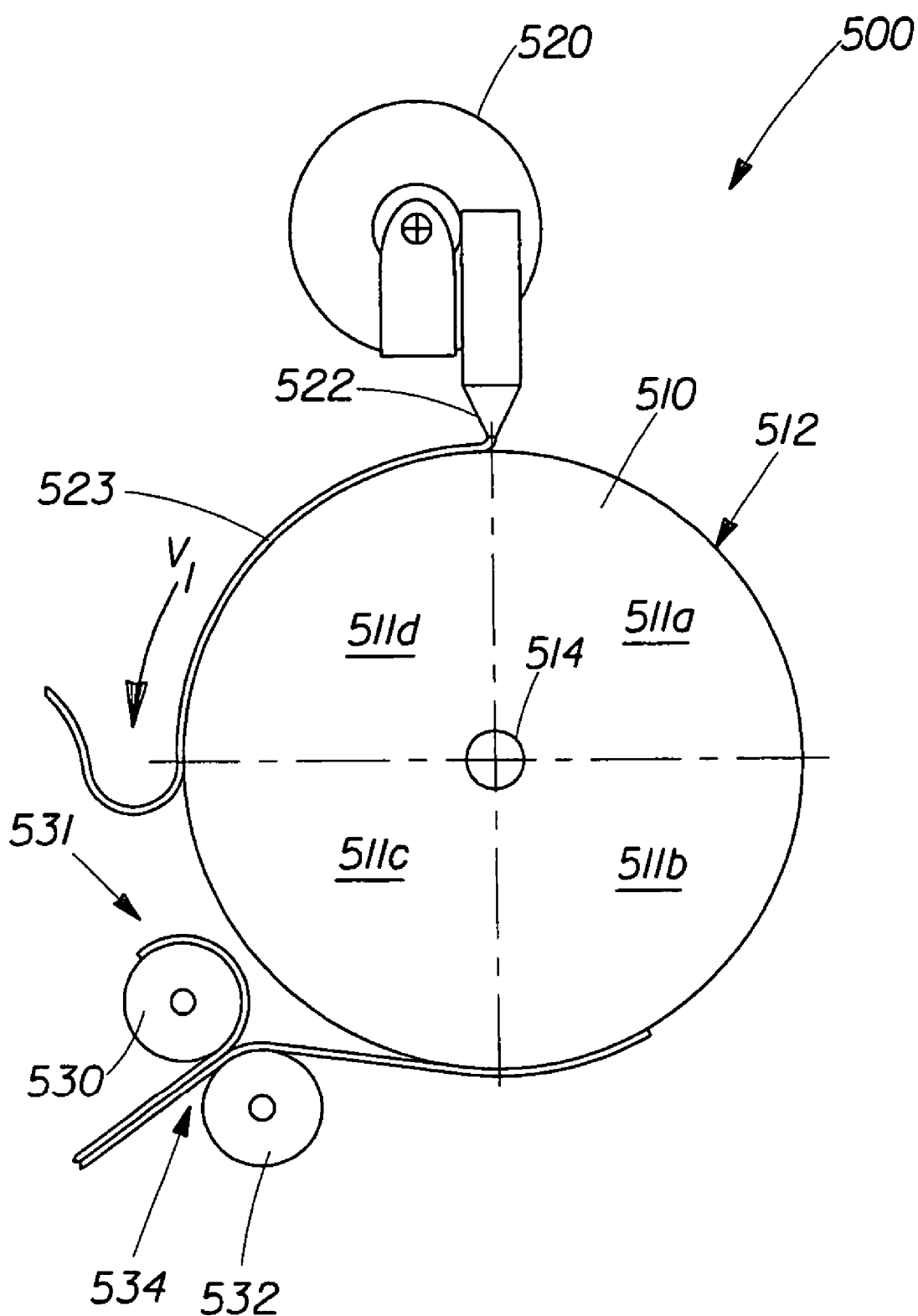
FIG. 5 is a schematic side elevation view of the apparatus in FIG. 1 illustrating the snap back of a broken elastomeric strand.

Another problem with the production of laminate structures utilizing extruded elastomeric is that if the strands 523 break, the strands 523 tend to snap back a significant distance along the cooled surface 512 of the drum 510 as shown in FIG. 5. The snap back of the broken strand causes alignment problems with the remaining strands along a significant portion of the snap back distance. The resultant laminate receiving the strands within the snap back distance of the broken strands are therefore wasted because of strand alignment issues. (See FIG. 6*c*).

Figure 6:
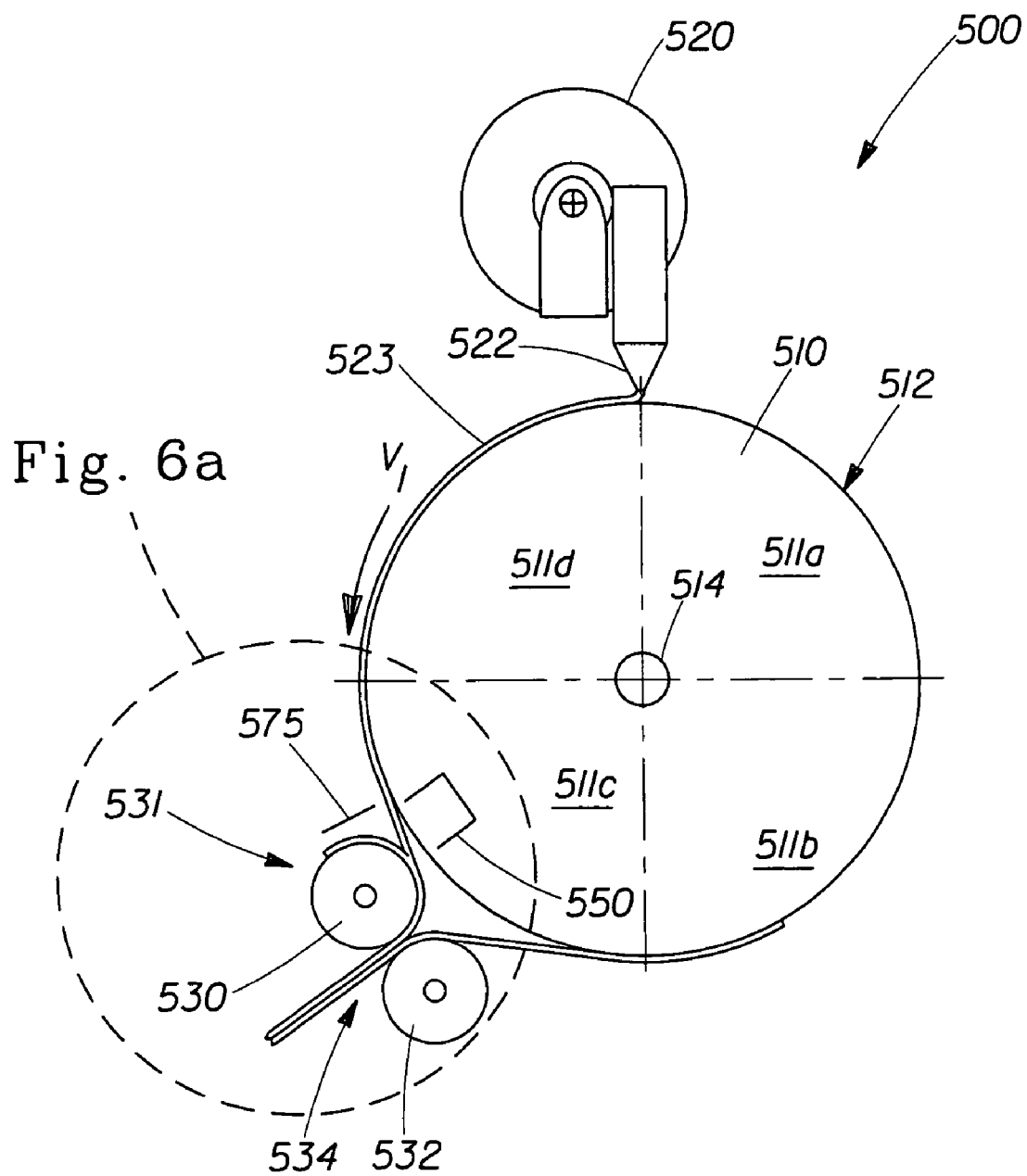
FIG. 6 is a schematic side elevation view of the apparatus of FIG. 1 including features which minimize the snap back of broken elastomeric strands.
Figure 6A:
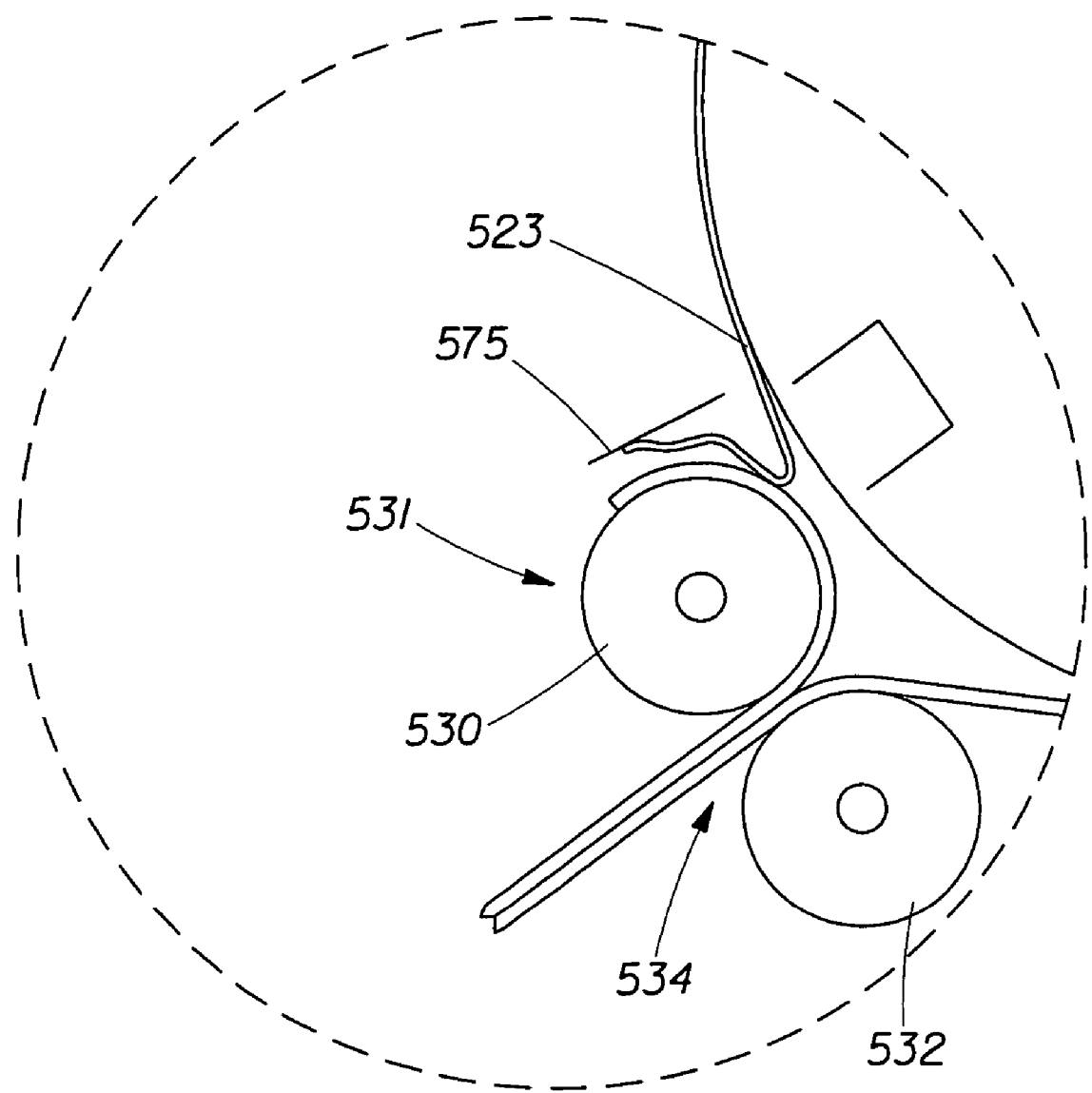
FIG. 6a is a close up of the feature which minimizes the snap back of the broken elastomeric strand.
Figure 6B:
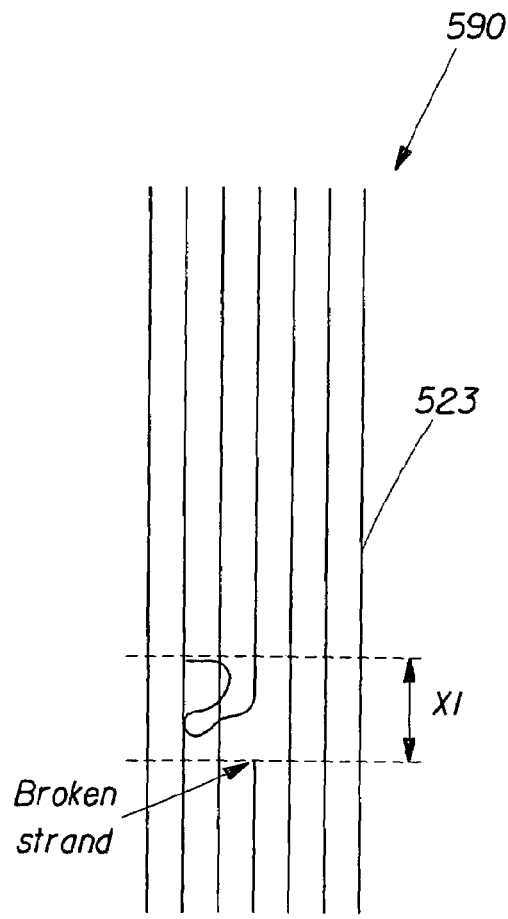
FIGS. 6b and 6c are plan views of laminate structures showing the effect of snap back with and without the minimizing snap back feature.
Figure 6C:
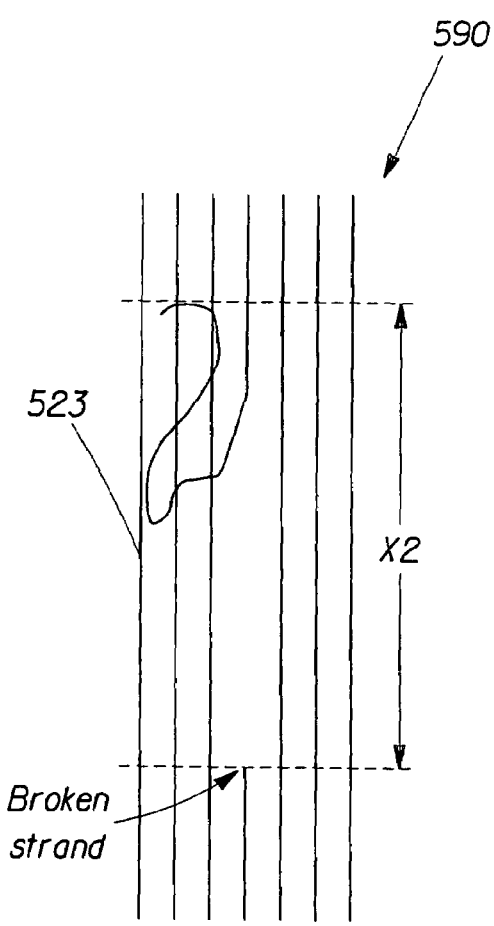

In order to minimize the amount of material lost because of this breakage, a deflector device can be installed as shown in FIG. 6. A deflector plate 575 is disposed adjacent to external surface 512 of the drum 510 proximate to the first roller 530. The deflector plate 575 precludes the strands 523 from snapping back a significant distance along the external surface 512 of the drum 510. As shown in FIG. 6*a*, the broken strand 523 strikes the deflector plate 575 which minimizes the distance the strand 523 can snap back. Because the snap back distance of the strand is minimized, the amount of resultant laminate structure that is scrapped is also minimized. As can be seen in exaggerated form in FIGS. 6*b* and 6*c*, the amount of scrapped elastomeric laminate is minimized with the utilization of the deflector plate.

Note that the deflector plate 575 is merely an example of how to minimize the snap back of the elastomeric strands. The deflector device can be a roller which engages the cooled external surface 512 of the drum 510. Conversely, if the deflector device is a roller, the roller may be disengaged from the cooled external surface 512 of the drum 510. The deflector device may comprise any device well known in the art for sustaining elastomeric strands.

Another problem is the exposed adhesive on the first bonding surface of the first nonwoven. Because there is exposed adhesive on the resulting bi-laminate structure of a first nonwoven joined to a plurality of strands, any down stream converting operations are virtually impossible. Additionally, the resulting laminate structure is gathered which renders the resulting laminate structure difficult to roll wind. Consequently, it is preferred to cover the elastomeric strands that are exposed on the first bonding surface of the first nonwoven. Such covering may include a flexible release paper joined to the first bonding surface downstream of the nip or a second nonwoven which can be joined to the first nonwoven either upstream or downstream of the nip.

Figure 7:
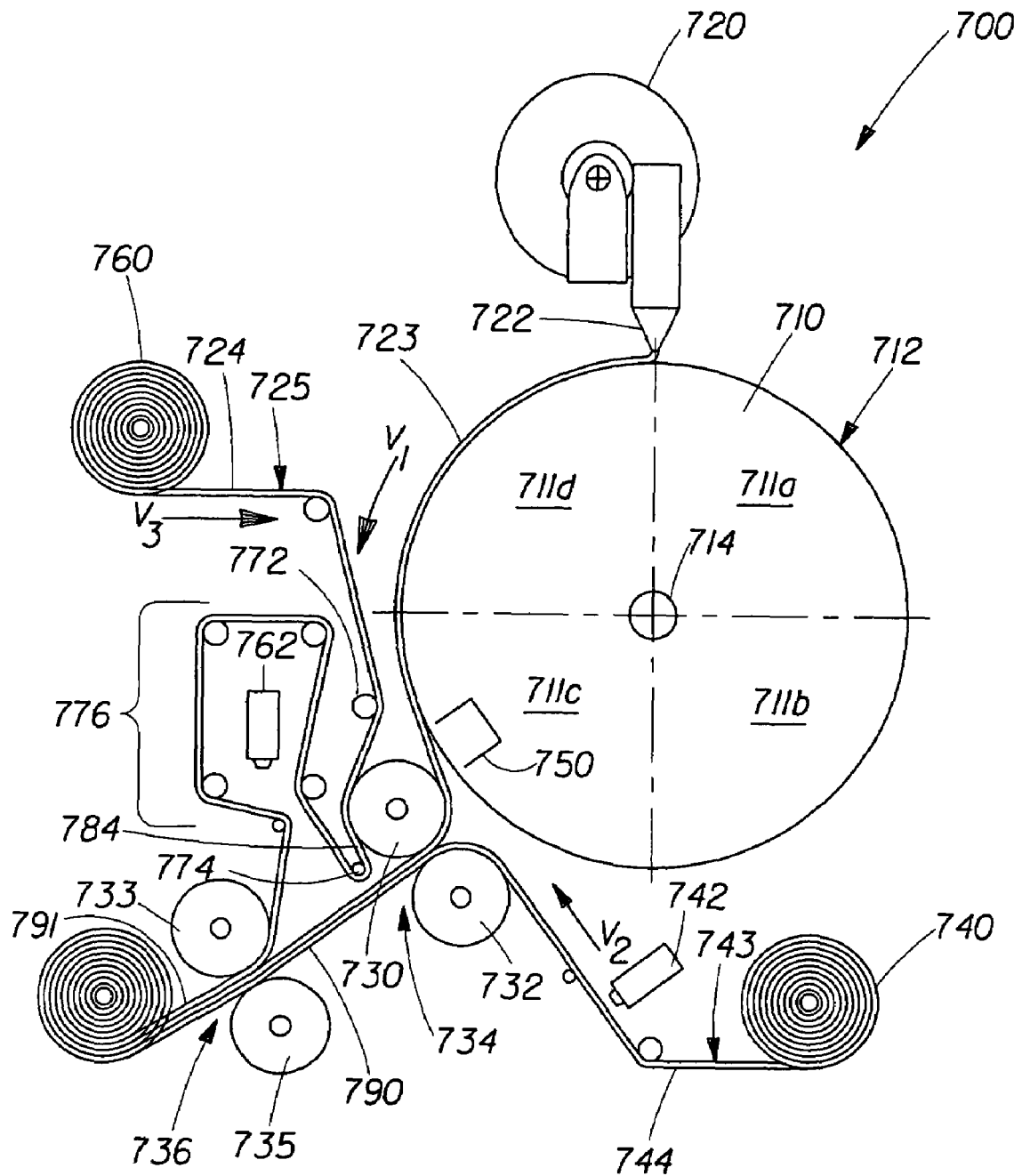
FIG. 7 is an apparatus for laminating a second nonwoven to a laminate having a first nonwoven and a plurality of elastomeric strands including features which enable the second nonwoven to swipe a nip roller of residual elastomeric strands in advance of joining the second nonwoven to the laminate.

As shown in FIG. 7, additional elements may be added to the apparatus of FIG. 1 in order to maintain the cleanliness of the first roller and thereby preclude the strands from winding around the first roller while also placing a second nonwoven on the nonwoven laminate 790. As an example, the apparatus 700 shows a second nonwoven source 760 which provides a second nonwoven 724 having a second bonding surface 725 to a third roller 733. A first plurality of rollers comprising a first idler 772 and a first pivot roller 774, and a first series of rollers 776, are positioned between the second nonwoven source 760 and the third roller 733. The first idler 772 and the first pivot roller 774 direct the second bonding surface 725 of the second nonwoven 724 to make contact with the first roller 730 downstream of the first nip 734 which is formed by the first roller 730 and the second roller 732. By making contact with the first roller 730, the second bonding surface 725 can remove elastomeric strands 723 that stick to the first roller 730 and fail to transfer or adhere to the first nonwoven 744 in the first nip 734.

The first pivot roller 774 can be arranged to force the second nonwoven 724 in a reverse direction near the first roller 730 causing any stray strands collected from the first roller 730 to expel from the second bonding surface 725. The first pivot roller 774 is preferably small having a diameter which is less than about 20 mm. In an alternate embodiment, the first pivot roller 774 can be replaced with a static plate or sheet, however, a roller is preferred since a static plate or sheet can induce strain on the nonwoven causing necking.

From the first pivot roller 774, the second nonwoven 724 can be made to proceed to a first series of rollers 776. The first series of rollers 776 are arranged relative to the first pivot roller 774 such that the angle 784 between second nonwoven 724 approaching the first pivot roller 774 and the second nonwoven 724 departing the first pivot roller 774 ranges from 0 degrees to 90 degrees. As shown in FIG. 7, the first series of rollers 776 directs the second nonwoven 724 first away from the first pivot roller 774 and then back to the third roller 733. The first series of rollers 776 can also be arranged to direct the second nonwoven 724 to a second adhesive applicator 762 applying an adhesive to the second bonding surface 725 prior to passing through the second nip 736 formed by the third and fourth rollers 733 and 735.

The third and fourth rollers 733, 735 are mounted downstream of the first nip 734 created by the first and second rollers 730, 732. The third and fourth rollers 733, 735 rotate about two parallel axes, where each provides a surface speed V3. The surface speed V3 of each of the rollers is less than the surface speed V2 of the first and second rollers 730, 732. Note that if V3 is equal to V1 (the surface speed of the drum 710), then the elastomeric strands 723 of the elastomeric laminate 790, prior to entering the second nip 736, are fully relaxed. However, if V3 is less than V2 but greater than V1, then the elastomeric strands 723 of the elastomeric laminate 790 are only partially relaxed.

The elastomeric laminate 790 passes beneath the first pivot roller 774 so that any strands expelled from the second bonding surface 725 at the first pivot roller 774 can be recollected onto the elastomeric laminate 790 prior to reaching the second nip 736. From the first nip 734 the elastomeric laminate 790 passes through the second nip 736 where the elastomeric laminate is joined to the second nonwoven 724.

Figure 8:
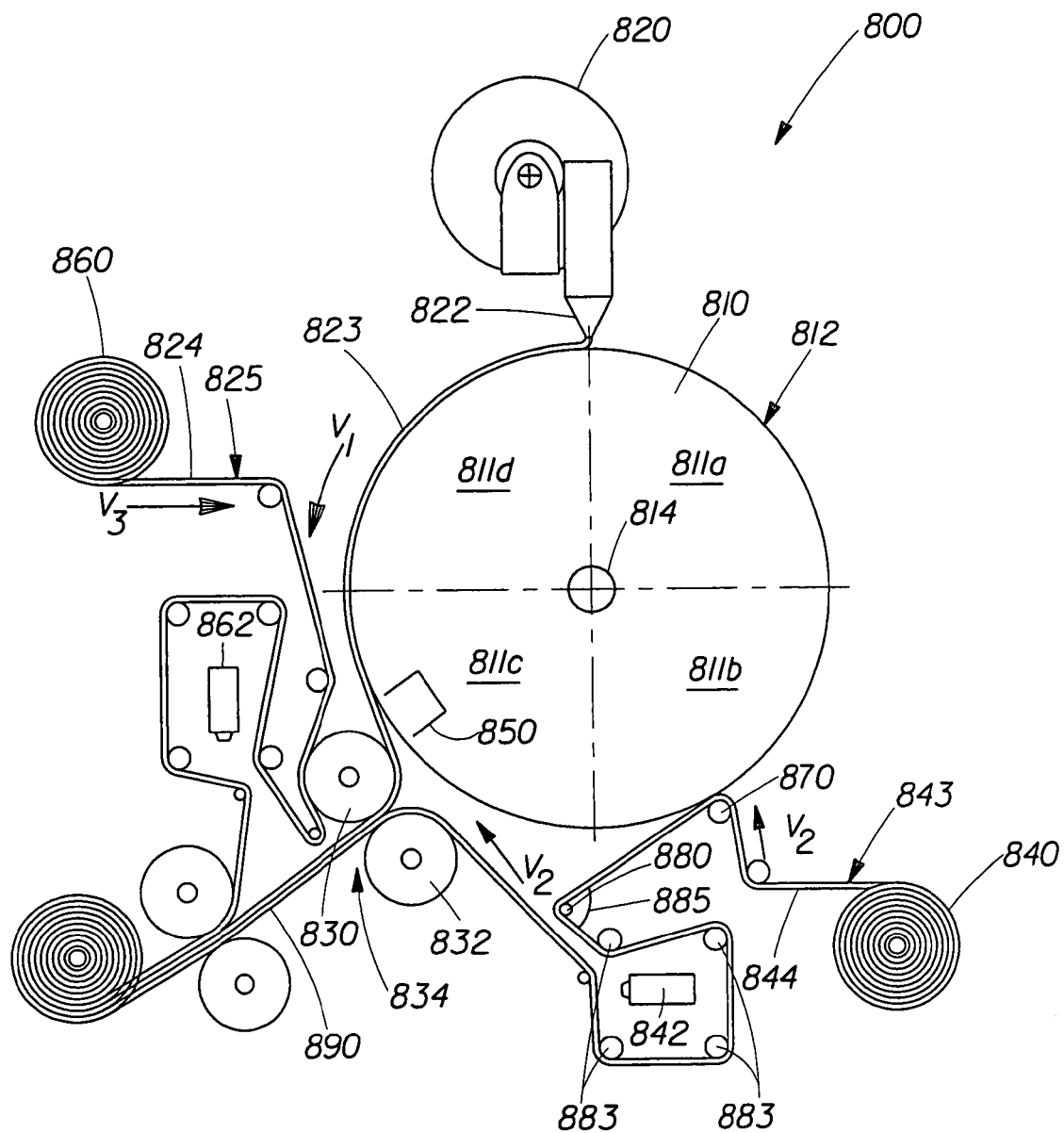
FIG. 8 is a schematic side elevation view of the apparatus in FIG. 7 including features which enable a first nonwoven to swipe a drum of residual elastomeric strands in advance of a first nip.

In addition to the apparatus of FIG. 7 which has a cleaning mechanism for the first roller, the apparatus may include additional elements allowing for the cleaning of the drum as well. As shown in FIG. 8, apparatus 800 provides additional elements for the cleaning of the drum 810. A second plurality of rollers comprising a second idler 870, a second pivot roller 880, a second series of rollers 883 are positioned between the first nonwoven source 840 and the second roller 832. The second idler 870 is disposed adjacent to the second quadrant 811*b* of the cooled surface 812 of the drum 810. The second idler 870 directs the first bonding surface 843 of the first nonwoven 844 into contact with the cooled surface 812 of the drum 810 in advance of reaching the second roller 832. By making contact with the cooled surface 812 of the drum 810, the first bonding surface 843 can remove elastomeric strands that stick to the cooled surface 812 of the drum 810 failing to transfer to the nip 834 formed by the first and second rollers 830, 832, respectively.

After removing stray strands from the cooled surface 812 of the drum 810, the first nonwoven 844 can be made to proceed to a second pivot roller 880 located adjacent to the second roller 832 forming the first nip 834, a select distance from the second idler 870. The second pivot roller 880 can be arranged to force the first nonwoven 844 in a reverse direction near the second roller 832 causing any stray strands collected from the cooled surface 812 of the drum 810 to expel from the first bonding surface 843. The second pivot roller 880 is preferably small having a diameter which is less than about 20 mm. In an alternate embodiment, the second pivot roller 880 can be replaced with a static plate or sheet, however, as mentioned previously, a roller is preferred since a static plate or sheet can induce strain on the nonwoven causing necking.

From the second pivot roller 880, the first nonwoven 844 can be made to proceed to a second series of rollers 883. The second series of rollers 883 are arranged relative to the second pivot roller 880 such that the angle 885 between first nonwoven 844 approaching the second pivot roller 880 and the first nonwoven 844 departing the second pivot roller 880 ranges from 0 degrees to 90 degrees. As shown in FIG. 8, the second series of rollers 883 directs the first nonwoven 844 first away from the second pivot roller 880 and then back to the second roller 832 forming the first nip 834 along a path which passes the first bonding surface 843 beneath the second pivot roller 880 so that any strands expelled from the first bonding surface 843 at the second pivot roller 880 can be recollected onto the first bonding surface 843 prior to reaching the second roller 832. The second series of rollers 883 can also be arranged to direct the first nonwoven 844 to a first adhesive applicator 842 applying an adhesive to the first bonding surface 843 prior to passing beneath the second pivot roller 880.

Forcing the first bonding surface 843 of the first nonwoven 844 to make contact with the cooled surface 812 of the drum 810 in the second quadrant 811b has other advantages such as enabling the apparatus to automatically thread itself during initial startup. During initial startup, the elastomeric strands 823 are not heavy enough to automatically separate from the cooled surface 812 of the drum 810 and transfer to the first roller 830. As a result, the elastomeric strands 823 stick to the cooled surface 812 of the drum 810, bypassing the first roller 830 in the third quadrant 811c. By forcing the first bonding surface 843 into contact with the cooled surface 812 of the drum 810 in the second quadrant 811b, the elastomeric strands 823 are removed from the cooled surface 812 of the drum 810 and redirected to the first nip 834 formed between the first and second rollers 830, 832, respectively.

Figure 9A:
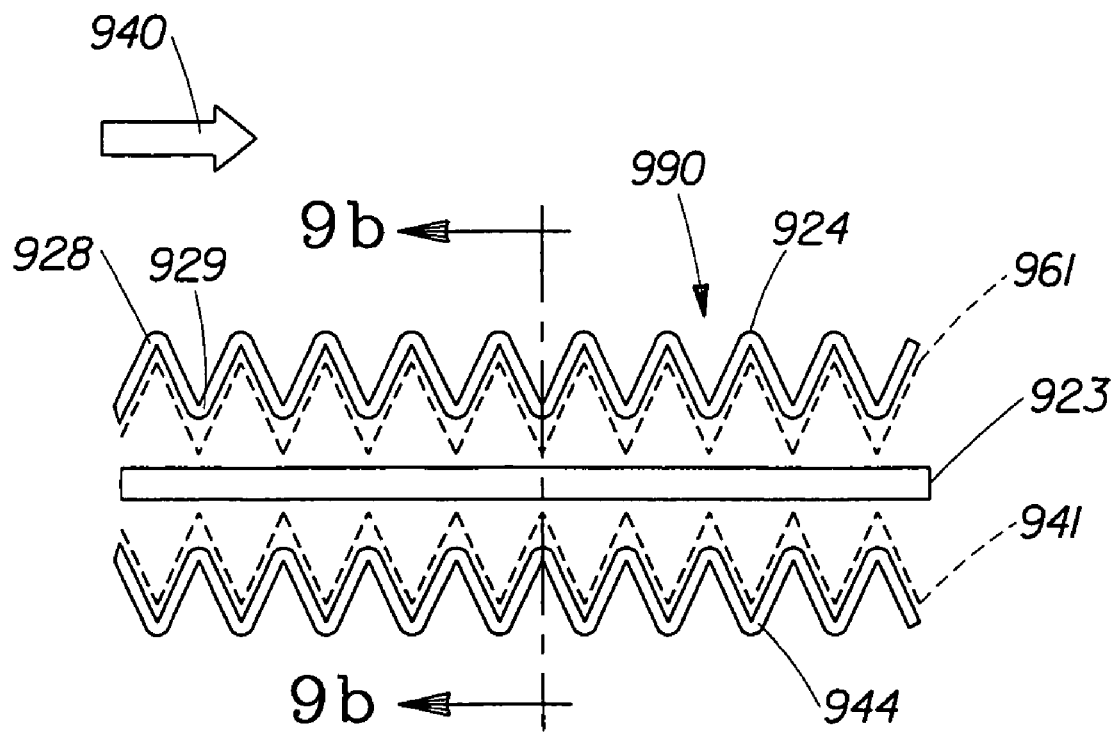
FIG. 9a is a side view of the elastomeric nonwoven laminate produced on the apparatus depicted in FIGS. 3 and 7-8.
Figure 9B:
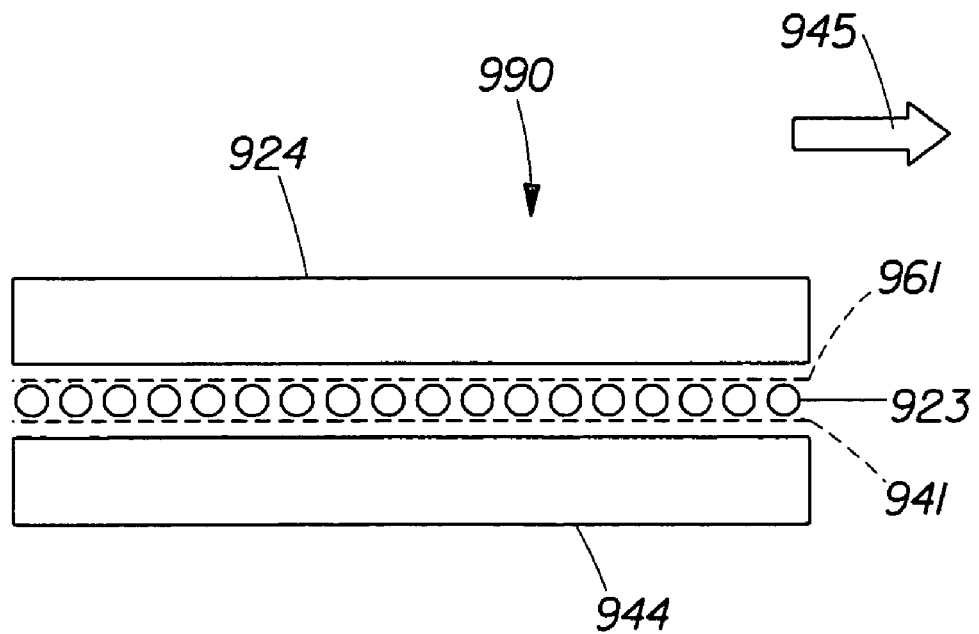

An elastomeric nonwoven laminate produced using any apparatus and method of the present invention disclosed herein with regard to FIGS. 3, 7, and 8, is illustrated in FIGS. 9a and 9b. Note that with regard to FIG. 3, a first adhesive 941 is not present.

FIG. 9a shows, in exaggerated form, the corrugation of the first and second nonwovens 944, 924, respectively with corrugation hills 928 and corrugation valleys 929 that occur after the first and second nonwovens 944, 924 are joined to the elastomeric strands 923. Corrugation is used to describe irregular corrugation hills 928 and corrugation valleys 929 that alternate. As shown, the first and second nonwovens 944, 924 are corrugated in the cross direction 945 with the corrugation hills 928 and corrugation valleys 929 alternating in the machine direction 940. Once a strain is placed on the elastomeric laminate 990 in the machine direction 940, the corrugations enable the first and second nonwovens 944, 924 to extend with the plurality of elastomeric strands 923 at least to the point of reaching the force wall, which is about where the corrugations flatten out. As the strain is removed, the plurality of elastomeric strands 923 contracts back toward their original, relaxed length. This contraction causes the observed first and second nonwoven 944, 924 corrugations.

Strain is measured as the percent of length increase in the plurality of elastomeric strands 923 under load. For example, a strand with a free and stretchable strand length of 15 centimeters (cm) may have a load applied such that the 15 cm strand elastomeric is now 18 cm long. This length increase of 3 cm is 20% of 15 cm (3/15), or a 20% strain. The elastomeric nonwoven 990 produced according to the present invention may have a strain ranging from about 20% to about 500%, preferably from about 100% to about 400%, and more preferably from about 200% to about 400%.

Since the primary function of the elastomeric nonwoven laminate is to be stretchable, the elastomeric nonwoven laminate is capable of at least a 50% strain prior to reaching the force wall. Although the force wall has generally been described as the point where the corrugations nearly flatten out, the force wall typically occurs when the force required for a 10% increase in strain increases at least about 20%. Depending upon design choice and the particular application of the elastomeric nonwoven laminate, the elastomeric nonwoven laminate can be made to endure a strain greater than 50%, 100%, 200%, or 300% prior to reaching the force wall. Preferably, the elastomeric nonwoven laminate produced according to the present invention is capable of at least a 100% strain prior to reaching the force wall. More preferably, the elastomeric nonwoven laminate is capable of at least a 200% strain prior to reaching the force wall.

The first nonwoven and the second nonwoven may comprise any nonwoven material known in the art. The first nonwoven and the second nonwoven may comprise fibers made of polypropylene, polyethylene, polyester, nylon, cellulose, polyamide, or combinations of such materials. Fibers of one material or fibers of different materials or material combinations may be used in the first and/or second nonwoven.

Any process known in the art may be used to make the first nonwoven and/or the second nonwoven. Exemplary processes include spunbond, spunbond meltblown spunbond (SMS), spunbond meltblown meltblown spunbond (SMMS), carded and the like. Particularly acceptable nonwovens include high elongation carded (HEC) nonwovens and deep activation polypropylene (DAPP) nonwovens.

The first nonwoven and the second nonwoven may comprise fibers that are bonded internally, including fibers that are needle punched, hydro entangled, spun bonded, thermally bonded, bonded by various types of chemical bonding such as latex bonding, powder bonding, and the like. Preferably, the basis weight of the first nonwoven and/or second nonwoven is in the range of about 10 gsm to about 30 gsm.

The elastomeric strands preferably extend in a parallel uniformly spaced arrangement between the first nonwoven and the second nonwoven. However, the elastomeric strands may be arranged in any configuration desired. For instance, the strands may be arranged to provide a specific force profile in the elastomeric nonwoven laminate by varying the thickness of the individual strands or the spacing between them.

In addition, the shape of the elastomeric strands is not limited. For example, typical elastomeric strands have a circular cross sectional shape, but sometimes the plurality of elastomeric strands may have different shapes, such as a trilobal shape, or a flat (i.e., "ribbon" like) shape. Further, the thickness or diameter of the elastomeric strands 23 may vary in order to accommodate a particular application.

The plurality of elastomeric strands is preferably made of a resiliently elastic thermoplastic material. The elastomeric strands may be made from liquid elastomeric that can be extruded through a die to achieve a desired strand elastomeric diameter and/or shape. The elastomeric strands are preferably styrene block copolymers, polyurethane or latex rubber having a diameter ranging between about 0.15 mm and about 0.5 mm and a density ranging from about 600 kg/m$^3$ to about 1250 kg/m$^3$.

Although the first nonwoven, second nonwoven and plurality of elastomeric strands have been described as adhesively bonded, they may be joined by any joining means known in the art. Some examples of suitable joining means and/or methods for joining include, but are not limited to, adhesives, cohesives, thermal bonding, pressure bonding, mechanical bonds, ultrasonic bonding, radio frequency bonds and/or any combination of any known methods of joining such materials.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description of the Invention are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An apparatus for producing a nonwoven elastomeric laminate from a plurality of elastomeric strands and a nonwoven layer, the apparatus comprising:
    a drum having a cooled surface rotating about an axis and having a surface speed $V_1$, the drum having an upper half and a lower half;
    an extruder extruding a plurality of molten streams of polymer onto the cooled surface of the upper half of the drum at a point of extrusion to form a plurality of elastomeric strands;
    a transferring device positioned proximate to the cooled surface of the drum, the transferring device having a surface speed $V2$ which is greater than the surface speed $V1$ of the drum, whereby the drum transfers the plurality of elastomeric strands to the transferring device in a controlled distribution and wherein the span of unsupported strands between the cooled surface of the drum and the transferring device is between abd 10 mm and about 200 mm;
    a first nonwoven source supplying a first nonwoven having a first bonding surface to the transferring device; and
    an adhesive source for applying adhesive in advance of the transferring device, wherein the plurality of elastomeric strands are joined to the first bonding surface of the first nonwoven at a point of lamination thereby forming a nonwoven elastomeric laminate wherein the distance measured between any two adjacent strands varies 30% or less from the point of extrusion to the point of lamination.

2. The apparatus of claim 1 further comprising a startup device disposed adjacent to the drum downstream of the extruder adaptable for engaging or disengaging the cooled surface of the drum such that when the startup device engages the cooled surface of the drum, the plurality of elastomeric strands travel along the cooled surface of the drum at the surface speed $V_1$ of the drum.

3. The apparatus of claim 2 further comprising a scraper engaged with the startup device such that the elastomenc strands are precluded from winding around the startup device.

4. The apparatus of claim 1 further comprising a scraper positioned adjacent to the cooled surface of the drum and adjacent the transferring device, the scraper being adaptable for engaging the cooled surface of the drum so that the scraper removes elastomeric strands from the cooled surface of the drum that inadvertently fail to transfer to the transferring device.

5. The apparatus of claim 1 further comprising a deflector device disposed adjacent to the cooled surface of the drum such that snap back distances of broken strands are minimized.

6. The apparatus of claim 1 wherein the transferring device comprises a roller positioned proximate to the cooled surface of the drum, wherein the first nonwoven is tensioned such that the first bonding surface contacts the roller thereby creating a nip force to form the elastomeric nonwoven laminate.

7. The apparatus according to claim 1 wherein the span of unsupported strands between the cooled surface of the drum and the transferring device is between about 20 mm and about 50 mm.

8. The apparatus according to claim 1 further comprising a second nonwoven web source supplying a second nonwoven having a second bonding surface to the transferring device, wherein the first and second bonding surfaces of the first and second nonwovens are joined in a face-to-face arrangement at the transferring device sandwiching the plurality of elastomeric strands therebetween in a controlled distribution.

9. The apparatus according to claim 8, further comprising a second adhesive source located between the second nonwoven source and the transferring device for applying adhesive to the second bonding surface in advance of reaching the transferring device, wherein the adhesive source applies adhesive to the first bonding surface.

10. The apparatus of claim 1 wherein the first bonding surface of the first nonwoven is directed to make contact with the cooled surface of the drum so that the first bonding surface removes strands from the cooled surface of the drum that inadvertently fail to transfer to the transferring device and wherein a second nonwoven source supplies a second nonwoven having a second bonding surface to the transferring device, wherein the adhesive source applies adhesive to the second bonding surface in advance of the transferring device such that the second nonwoven can be bonded to the first nonwoven.

* * * * *

UNITED STATES PATENT AND TRADEMARK OFFICE
CERTIFICATE OF CORRECTION

PATENT NO. : 7,389,804 B2
APPLICATION NO. : 11/787373
DATED : June 24, 2008
INVENTOR(S) : Uwe Schneider et al.

It is certified that error appears in the above-identified patent and that said Letters Patent is hereby corrected as shown below:

<u>Claim 1</u>

Col. 13, line 62, delete "abd" and insert -- about --.

<u>Claim 3</u>

Col. 14, line 17, delete "elastomenc" and insert -- elastomeric --.

Signed and Sealed this

Twenty-third Day of December, 2008

JON W. DUDAS
*Director of the United States Patent and Trademark Office*